US011799634B2

(12) United States Patent
Hamila et al.

(10) Patent No.: US 11,799,634 B2
(45) Date of Patent: Oct. 24, 2023

(54) MESH NETWORK FOR RESOURCE-CONSTRAINED DEVICES

(71) Applicants: Qatar Foundation for Education, Science and Community Development, Doha (QA); Iberdrola QSTP LLC, Doha (QA); Qatar University, Doha (QA)

(72) Inventors: Ridha Hamila, Doha (QA); Omar Ellabban, Doha (QA); Adel Gastli, Doha (QA); Ula Hijawi, Doha (QA); Devrim Unal, Doha (QA)

(73) Assignees: QATAR FOUNDATION FOR EDUCATION, SCIENCE AND COMMUNITY DEVELOPMENT, Doha (QA); IBERDROLA QSTP LLC, Doha (QA); QATAR UNIVERSITY, Doha (QA)

( * ) Notice: Subject to any disclaimer, the term of this patent is extended or adjusted under 35 U.S.C. 154(b) by 208 days.

(21) Appl. No.: 17/490,511

(22) Filed: Sep. 30, 2021

(65) Prior Publication Data
US 2022/0103353 A1    Mar. 31, 2022

Related U.S. Application Data

(60) Provisional application No. 63/085,276, filed on Sep. 30, 2020.

(51) Int. Cl.
*H04L 29/06* (2006.01)
*H04L 9/08* (2006.01)

(52) U.S. Cl.
CPC ........... *H04L 9/0825* (2013.01); *H04L 9/083* (2013.01); *H04L 9/0866* (2013.01)

(58) Field of Classification Search
CPC ..... H04L 9/0825; H04L 9/083; H04L 9/0866; H04L 67/12; H04L 41/12; H04L 67/104;
(Continued)

(56) References Cited

U.S. PATENT DOCUMENTS 8,495,360 B2 * 7/2013 Falk .................... H04L 63/0892
713/182
8,559,631 B1   10/2013 Waters
(Continued)

FOREIGN PATENT DOCUMENTS

CN     107484161 A      12/2017
CN     110247767 A  *   9/2019  ......... H04L 63/0442
(Continued)

*Primary Examiner* — Yogesh Paliwal
(74) *Attorney, Agent, or Firm* — K&L Gates LLP

(57) ABSTRACT

IoT frameworks require flexible and scalable communication and security schemes that can be deployed on devices of low computational capabilities and memory (e.g., resource-constrained devices). A system is provided including a mesh network of resource-constrained devices creating a self-organizing and collaborative communication topology between the devices, and an attribute-based encryption security scheme integrated with the mesh network that enables the resource-constrained devices to communicate securely in unsecured channels by defining an access policy that can only be satisfied by the authorized resource-constrained devices. In order to integrate the attribute-based encryption scheme with the mesh network of resource-constrained devices, a serializer and deserializer are provided that prepare all communications to go through the attribute-based encryption scheme by converting all data and metadata into a suitable format for transmission over the network.

20 Claims, 7 Drawing Sheets

(58) Field of Classification Search
CPC ............ H04L 67/1093; H04L 63/0428; H04L 2209/805
See application file for complete search history.

(56) References Cited

U.S. PATENT DOCUMENTS

| | | | |
|---|---|---|---|
| 8,880,875 B1 | 11/2014 | Waters | |
| 9,049,023 B2 | 6/2015 | Green | |
| 9,894,043 B2* | 2/2018 | Khoury | .................. G06F 21/62 |
| 10,587,587 B2 | 3/2020 | Zhang | |
| 2014/0289513 A1* | 9/2014 | Huang | .................. H04L 9/3073 |
| | | | 713/160 |
| 2018/0359624 A1* | 12/2018 | Polo | ...................... H04W 88/04 |
| 2019/0173668 A1 | 6/2019 | Cui et al. | |
| 2019/0317818 A1* | 10/2019 | Krishna Rao | ........... H04L 67/10 |
| 2021/0044972 A1* | 2/2021 | Murray | ................ G06F 21/602 |

FOREIGN PATENT DOCUMENTS

| | | |
|---|---|---|
| FR | 3081652 A1 | 11/2019 |
| WO | 2017009067 A1 | 1/2017 |

* cited by examiner

MESH NETWORK FOR RESOURCE-CONSTRAINED DEVICES

PRIORITY CLAIM

The present application claims priority to and the benefit of U.S. Provisional Application 63/085,276, filed Sep. 30, 2020, the entirety of which is herein incorporated by reference.

BACKGROUND

Internet of Things (IoT) networks operating in lightweight resource-constrained devices have been growing constantly in a wide range of areas. Such networks collect sensitive information over time that represents the users' behavioral patterns, which necessitates the need for safe data communication. IoT big data unfolds sensitive information related to the user's behavioral patterns in distributed systems, and thus, security and privacy governance of IoT data communication requires lightweight cryptography to provide solutions targeting resource-constrained environments.

A number of challenges exist for building secure and interconnected IoT devices in wireless sensor networks (WSNs) from the device and network topologies perspectives in terms of device computational power capabilities, connection coverage, and security schemes compatibility. From the device perspective, desktop computer environments provide high computational power and can run complex encryption schemes, but are not suitable for wireless sensor networks. Resource-constrained devices, on the other hand, are suitable for wireless sensor networks, but provide low computational power and have limited available encryption schemes. Additionally, according to the National Institute of Standards and Technology (NIST), transitioning from conventional cryptography optimized for desktop computer environments to resource-constrained devices incurs a wide range of new security concerns, such as inefficient computing performance and battery consumption. There are therefore cyber-security difficulties caused by the use of resource-constrained devices that collect, transmit, and receive data in WSNs.

From the network perspective, in a traditional WiFi network architecture, every single node, or device, is connected directly to the central node, or the router, known as the access point for data transmission to the cloud. However, this requires every device to be within range to directly connect with the access point, making it a great disadvantage to the network when the devices suffer from limited coverage area as in distributed IoT networks. The traditional WiFi network architecture having an access point may therefore have a high compatibility with devices, but has restricted coverage. Typical systems do not offer a desired scalability of interconnected resource-constrained IoT devices that effectively self-organize and collaborate for secure data communication in distributed areas. Mesh networks provide self-expanding coverage and are compatible with resource-constrained devices, but are less popular with encryption schemes. Accordingly, a need exists for a system that solves the above drawbacks.

Attribute-Based Encryption (ABE) has been identified as a promising public-key scheme that enables flexible data distribution, fine-grained access control, and scalable key management in IoT deployments. Being an extension of identity-based cryptography, ABE schemes allow cipher-text decryption to be executed only by users with the desired attributes that satisfy an access policy. The encrypting entity (sender) and the decrypting entity (receiver) do not need to pre-share secret keys, simplifying key management operations in large-scale and dynamic systems. In Key Policy Attribute-Based Encryption (KPABE) schemes, only if the set of attributes associated with the encryptor satisfies the access policy associated with the receiver's private keys, can the encrypted data be decrypted successfully.

Additionally, communication between IoT devices is done wirelessly. The data is encrypted with the named ABE scheme, and communicated through a mesh network. A mesh network is a local network topology in which nodes link directly to as many other nodes as possible and collaborate with each other to effectively route data between network nodes. In order to deploy the above mentioned communication and security schemes in IoT frameworks, flexible and scalable development environments must be implemented on resource-constrained devices of low computational capabilities and memory.

In general, encryption keys in ABE can be made public by the data owners, whereas decryption keys are made private to the decrypting users. An access policy is expressed by Boolean operations (AND or OR operators) that follow a bottom-up tree fashion referred to as the policy tree. The ends of a policy tree (from the bottom) are known as the leaf nodes, of which converge to an intermediate node. An intermediate node stems into other nodes known as 'children,' which can be the leaf nodes or other intermediate nodes. Intermediate nodes converge eventually to the root node, which is the final operator to be processed in the tree. As mentioned above, in KPABE schemes, an access policy is associated with the private key of the decrypting party, whereas the set of attributes is associated with the cipher-text encrypted by the data owner. Decryption is successful when the set of attributes contains the 'required' attributes that satisfy the policy, thus, the access policy is then evaluated to be true. The leaves of the tree represent the 'required' attributes to satisfy the policy.

KPABE mainly consists of four function algorithms: (1) Setup($1^k$), (2) Encrypt(M, w, Params), (3) KeyGen($\tau$, MK), and (4) Decrypt(M or $\perp$). Setup($1^k$) initializes the algorithm and takes a security parameter to randomly generate and return the public key parameters Params used for encryption, and the private Master Key MK. Encrypt(M, w, Params) encrypts a plaintext message M, associated with a set of attributes w using the public parameters Params to return the cipher-text CT. CT is now associated with the attribute set to be tested by the access policy upon decryption. KeyGen($\tau$, MK) generates the decryption key DK using the master key MK and the access policy $\tau$. The DK now corresponds to $\tau$. Decrypt(M or $\perp$) decrypts the cipher-text CT to the original message M using the decryption key DK. The cipher-text is decrypted only when the associated set of attributes w satisfies the access policy $\tau$ associated with DK, and $\tau(w)=1$ evaluates true, otherwise, the algorithm returns a null message $\perp$.

The KPABE scheme is a no-pairing scheme eliminating the computationally expensive cryptographic bilinear pairing operations. It performs one point-scalar multiplication for each attribute in the attribute set in the encryption algorithm, and one point-scalar multiplication for each visited leaf in the policy tree in the decryption algorithm. It is also based on Elliptic Curve Cryptography (ECC) primitives. ECC is considered as the most efficient algorithm for large-scale and very constrained IoT environments due to its low energy consumption, fast processing time, and smaller key sizes than other modular exponent-based public key schemes at the same security level.

SUMMARY

The present disclosure provides new and innovative systems for secure communications among resource-constrained devices. The provided system implements Attribute-Based Encryption, such as the KPABE scheme, on a self-forming mesh network of resource-constrained devices, which helps secure communications between the resource-constrained devices and with a management system against attacks aimed to compromise those communications. In an example, a system includes a management system, a trusted third party system, a mesh network of a plurality of resource-constrained devices, and a key generator. The trusted third party system is in communication with the management system. The plurality of resource-constrained devices include a root node in communication with the trusted third party system via a network. Each of the plurality of resource-constrained devices is directly or indirectly in communication with the root node, and the root node is one of the plurality of resource-constrained devices. The key generator is in communication with the trusted third party system and each of the plurality of resource-constrained devices. The key generator is configured to generate a public key, a private key, and a decryption key. The private key is stored within a memory of the key generator, the public key is shared with the trusted third party system and each resource-constrained device capable of encrypting data, and the decryption key is shared with the trusted third party system and one of the plurality of resource-constrained devices which is capable of decrypting data. Data is encrypted and decrypted between the trusted third party system and the plurality of resource-constrained devices in the mesh network via an attribute-based encryption scheme integrated with the mesh network.

In another example, a system includes a management system, a trusted third party system, a mesh network of a plurality of resource-constrained devices, and a key generator. The trusted third party system is in communication with the management system. Each of the plurality of resource-constrained devices is a sensor, an actuator, or a sensor/actuator. The plurality of resource-constrained devices include a root node in communication with the trusted third party via a network. Each of the plurality of resource-constrained devices is directly or indirectly in communication with the root node, and the root node is one of the plurality of resource-constrained devices. The key generator is in communication with the trusted third party system and each of the plurality of resource-constrained devices. The key generator is configured to generate a public key, a private key, and a decryption key. The private key is stored within a memory of the key generator, the public key is shared with the trusted third party system and each sensor and sensor/actuator of the resource-constrained devices, and the decryption key is shared with the trusted third party system and each actuator and sensor/actuator of the resource-constrained devices. Data is encrypted and decrypted between the trusted third party system and the plurality of resource-constrained devices in the mesh network via a key policy attribute-based encryption scheme integrated with the mesh network.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
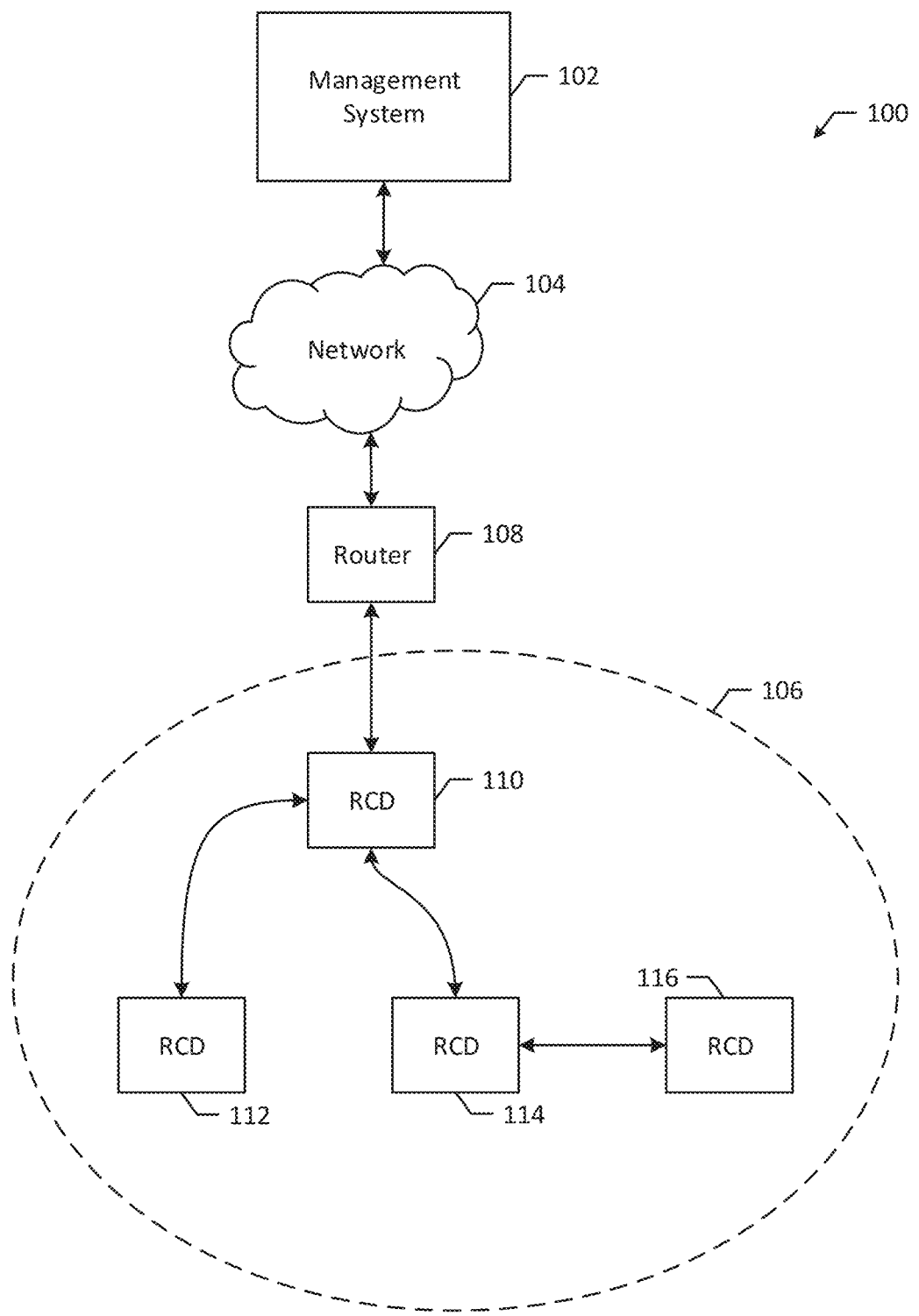
FIG. 1 illustrates a block diagram of a system for secure communications among resource-constrained devices, according to an aspect of the present disclosure.

The present disclosure provides a system for secure communications among resource-constrained devices. For instance, the provided system implements Attribute-Based Encryption (ABE), such as the KPABE scheme, on a self-forming mesh network of resource-constrained devices that enables secure communications between the resource-constrained devices and with a management system. A person having ordinary skill in the art is familiar with resource-constrained devices as that term is used in the art. For instance, resource-constrained devices are devices that by design have limited processing and storage capabilities to provide a maximal data output possible with a minimal power input while remaining cost-effective. As a result of their limited processing capabilities, resource-constrained devices are unable to perform costly operations such as encryption operations. Additionally, due to their frequent application as smart equipment operating in the field, in harsh conditions, hard-to-reach places, and/or other areas without an external power source, resource-constrained devices typically have an internal power source (e.g., batteries) to maintain the balance between the effective span of their lifetime and the potential costs of device replacement. Example resource-constrained devices include mobile devices, microcontroller units (MCUs), and various suitable sensors, actuators, or sensor/actuators, such as temperature sensors, moisture sensors, acoustic/noise sensors, light sensors, water level sensors, gyroscope sensors, motion sensors, presence/proximity sensors, chemical sensors, image sensors etc.

Additionally, a person having skill in the art is familiar with mesh networks as that term is used in the art. For instance, a mesh network is a local network topology in which the infrastructure nodes connect directly, dynamically and non-hierarchically to as many other nodes as possible and cooperate with one another to efficiently route data from/to clients. Stated differently, a mesh network is a group of devices that act as a single network (e.g., a single WiFi network) by routing data through one another.

The provided system may include multiple resource-constrained devices (e.g., sensing units) that need to communicate with each other and with a management system. In at least some aspects, the multiple resource-constrained devices are each a node in a mesh network. By applying a mesh networking topology, every resource-constrained device can route its data and its neighbor's data to another resource-constrained device in intermediate paths (e.g., wireless hops) to eventually reach a resource-constrained device acting as a root node. The root node resource-constrained device (hereinafter referred to as both a root node and a root node resource-constrained device) acts as the sink that communicates with the wider wireless network through an access point or router. Stated differently, each resource-constrained device in the provided system may communicate with the wider wireless networks through the root node resource-constrained device. In cases where multiple resource-constrained devices are within the range of the root node, they can each communicate with it directly and avoid a hop, unlike resource-constrained devices that are out of the range of the root node and still need to route through the wireless hops.

The mesh network in the provided system creates a self-forming downstream hierarchal connection layer joining all available authorized resource-constrained devices. Authorized resource-constrained devices within one common mesh network share one name (SSID) and password that identify the mesh network from another mesh network. In some aspects, the root node of the mesh network can be automatically selected based on its signal strength. In other aspects, the user can manually set a resource-constrained device as the network's root node regardless of its signal strength.

The provided system helps solve many of the cybersecurity related issues found in communications in conventional WiFi networks, and especially on resource-constrained devices that cannot effectively encrypt data. For instance, in some examples, the provided system may integrate the KPABE scheme into the mesh network architecture. In other examples, the provided system can alternatively utilize different suitable instances of the ABE schemes instead of KPABE. The KPABE scheme, or other suitable ABE scheme, helps ensure security of data routed in the mesh network topology of resource-constrained devices. In various aspects, the provided system is scalable for large buildings due to the self-forming and self-expanding nature of mesh networks.

KPABE, on its own, is merely a theoretical architecture; however, to implement such security scheme in real-life applications, proper integration with both a hardware platform and a communications system is necessary. From a communications standpoint, developing a KPABE implementation on a mesh networking architecture involves a number of challenges. First, the ESP-MESH architecture sends messages as a fixed-size string packet. Hence, all of the KPABE variables are required to be consolidated into one large string via a custom serializer. Second, when a message is received, the obtained string must be deconstructed into all the corresponding KPABE variables to ensure successful decryption. In terms of security, this additional step of serializing/deserializing can be a vulnerability if an eavesdropper captures the mesh packet, which can be exploited to find out the encrypted message. Thus, an integrated mesh-KPABE workflow is needed to mitigate the risk caused by transmitting a large string of data.

IoT frameworks require flexible and scalable communication and security schemes that can be deployed on devices of low computational capabilities and memory. The presently disclosed system provides a mesh network creating a self-organizing and collaborative communication topology between the devices, and an ABE security scheme (e.g., KPABE) that enables the IoT devices to communicate securely in unsecured channels by defining an access policy that can only be satisfied by the authorized IoT devices.

FIG. 1 illustrates a block diagram of an example system 100 for secure communications among resource-constrained devices (e.g., the resource-constrained devices (RCD) 110-116). The example system 100 may include a management system 102. The management system 102 may be any suitable system capable of receiving data from a network of resource-constrained devices (e.g., a wireless sensor network) and performing an action based on that received data. The management system 102 may include a memory in communication with a processor for processing the received data and executing the action based on the processing of the received data. In at least some instances, the management system 102 may be a server. In a few non-limiting examples, the management system 102 may be a building management system deployed inside houses, schools, or other facilities; a condition monitoring system that takes raw data input from distributed sensors within a facility to maintain its structural health or energy efficiency based on current waveforms, frequency, pressure, or vibration sensor data; a transportation modeling system that provide congestion alerts based on real-time traffic information collected from a wireless sensor network; an environmental monitoring system that provides raw sensor data from a wireless sensor network capturing data such as sensing air pollution, sensing glaciers, and detecting forest fires; or other suitable systems in which the Internet of Things (IoT) is deployed in a wireless sensor network.

The management system 102 may be in communication via a network 104 with a mesh network 106 (indicated by the dashed oval) of multiple resource-constrained devices. The network 104 can include, for example, the Internet or some other data network, including, but not limited to, any suitable wide area network or local area network. The mesh network 106 may include any suitable quantity of resource-constrained devices. In the illustrated example, the mesh network 106 includes the resource-constrained devices (RCD) 110, 112, 114, and 116. In at least some aspects, each resource-constrained device 110-116 in the mesh network 106 may be in wireless communication with one another. In other aspects, some of the resource-constrained devices 110, 112, 114, or 116 in the mesh network 106 may be in wired communication with one another. In one example, the mesh networks 106 is based on ESP-MESH which is a networking protocol built atop the Wi-Fi protocol, and the data can be encoded under an application layer protocol such as HTTP, MQTT, and JSON. Authorized devices within one zone share a common MESH network name (SSID) and password that identify the zone's MESH network from another.

Each of the resource-constrained devices 110-116 may be a node in the mesh network 106 including one of the resource-constrained devices 110-116 being a root node. In some aspects, the root node of the mesh network 106 can be automatically selected based on a signal strength of each of the resource-constrained devices 110-116 with respect to an access point or router 108. For example, the resource-constrained device 110, 112, 114, or 116 with the greatest signal strength may be selected as the root node. In other aspects, a user of the system 100 can manually set one of the resource-constrained devices 110-116 as the root node of the mesh network 106 regardless of the signal strengths of each of the resource-constrained devices 110-116. In the illustrated example, the resource-constrained device 110 is the root node of the mesh network 106. For instance, the resource-constrained device 110 is in communication with the router 108 which connects the resource-constrained device 110 to the management system 102 via the network 104. Each of the resource-constrained devices 112, 114, and 116, in this example, may be directly or indirectly in communication with the resource-constrained device 110 acting as the root node. For example, the resource-constrained devices 112 and 114 are shown in direct communication with the resource-constrained device 110. The resource-constrained device 116 is shown in indirect communication with the resource-constrained device 110 by way of a wireless hop through the resource-constrained device 114. It will be appreciated that, while not shown, a resource-constrained device in the mesh network 106 may take any number of wireless hop neighboring resource-constrained devices in order to reach the root node.

In some examples, a resource-constrained device 110, 112, 114, or 116 may include a processor in communication with a memory. For instance, a resource-constrained device 110, 112, 114, or 116 may include a ESP32 chip known in IoT deployments, which is supported with a dual-core microcontroller at 240 MHz, 520 KB of SRAM, and 448 KB of programmable ROM, and with both WiFi and Bluetooth connectivity. In some examples, a resource-constrained device 110, 112, 114, or 116 may be a mobile device or a microcontroller unit. In various examples, a resource-constrained device 110, 112, 114, or 116 may be a sensor, an actuator, or a sensor/actuator. As used herein, sensors collect real-time simple numeric data (e.g., temperature, humidity, presence, energy consumption, etc.) and transmit the data, actuators receive and execute commands in the form of simple strings or numbers, and a sensor/actuator is able to both collect and transmit data as well as receive and execute commands. Example sensors include temperature sensor, moisture sensor, acoustic/noise sensor, light sensor, water level sensor, gyroscope sensor, motion sensor, presence/proximity sensor, chemical sensor, image sensor, etc. In the illustrated example, the resource-constrained device 110 may be a sensor, the resource-constrained device 112 may be an actuator, the resource-constrained device 114 may be a sensor/actuator, and the resource-constrained device 116 may be a sensor.

As described, an Attribute-Based Encryption (ABE) scheme (e.g., the KPABE scheme), may be integrated with the mesh network 106 to secure communications to and/or from the resource-constrained devices 110-116. In order to integrate the ABE scheme with the mesh network 106 of resource-constrained devices 110-116, all communications must be prepared to go through the ABE scheme. All data and metadata must be converted into a suitable format to prepare data for transmission over the network. This process is called serialization. Serializing ABE objects involves the following components: the ciphered message, the decryption key, the encryption parameters (Cw), and the private key.

To serialize basic data types, such as characters, integers, or floats, the format is converted into its binary form. This can be done readily for the above data types, notwithstanding, converting a complex data type, such as components of the list above, can be quite challenging. The present disclosure provides a serializer for ABE tailored for constrained devices (e.g., ESP32). The provided serializer comprises a multi-stage binarizer that breaks down each component into its low-level counterparts. The low-level counterparts are then converted into a simple container data type (e.g., a character vector), which can be easily transmitted. After binarizing all components, an aggregator combines all of them into a single, large character vector that can be transmitted in one shot.

After the serialization is successfully transmitted over the network, the corresponding entity receives the data object. To convert it back into the components mentioned in the list, a deserializer is required. In conjunction with the proposed serializer, the present disclosure provides a deserializer to convert the serialized components back into their respective data types. The deserializer is composed of a disaggregator and a multi-stage debinarizer. To deserialize the received data object, the character vector is disaggregated into the character vectors corresponding to each component. After that, the vectors are further deserialized into their original complex objects with the use of special debinarization functions.

Integrating the ABE scheme with the mesh network 106 includes replacing the computationally expensive bilinear operations with one point-scalar multiplication for each attribute in the encryption process, and another point-scalar multiplication for each leaf in the access policy. The scheme therefore provides a no-pairing cryptographic solution. In at least some aspects, the ABE scheme is programmed in the memory of each resource-constrained device 110-116 (e.g., ESP32 device) in the system 100.

Figure 2:
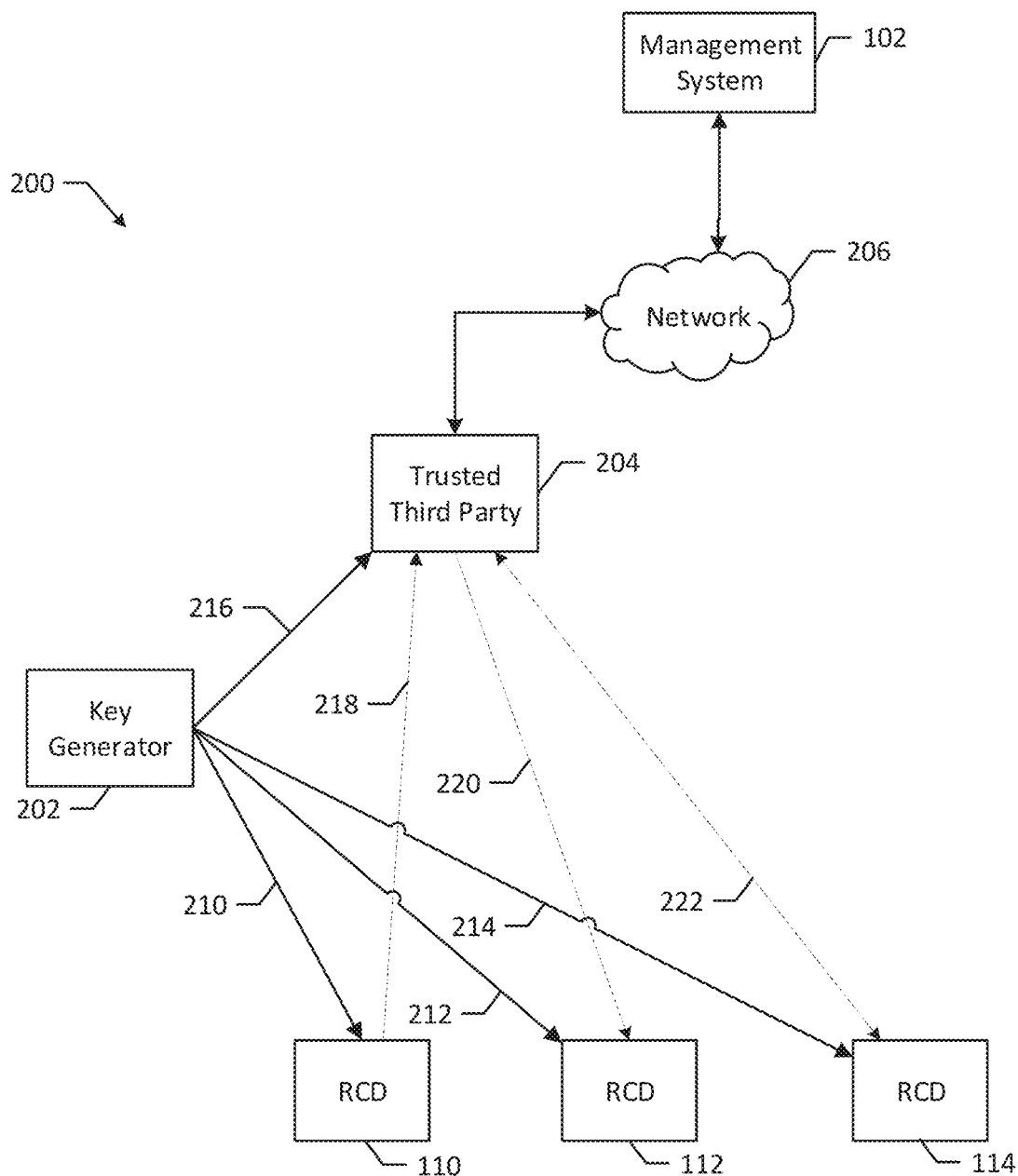
FIG. 2 illustrates a block diagram of a security architecture of the system shown in FIG. 1, according to an aspect of the present disclosure.

FIG. 2 illustrates a block diagram of an example system 200 showing an example security architecture for the provided system 100. While shown separately, the system 100 and the system 200 may be part of a single system. Stated differently, the security architecture of the system 200, which is shown in an end-to-end fashion, may be integrated with the system 100. The example system 200 may include the resource-constrained devices 110, 112, and 114, or any suitable quantity of resource-constrained devices in a mesh network (e.g., the mesh network 106). The resource-constrained devices 110, 112, and 114 may be in communication with a key generator 202. For example, the resource-constrained devices 110, 112, and 114 may communicate with the key generator 202 over a network (not shown) including, for example, the Internet or some other data network, including, but not limited to, any suitable wide area network or local area network.

A trusted third party 204, or sink, may be in communication with each of the resource-constrained devices 110, 112, and 114 in order to aggregate data from the resource-constrained devices 110, 112, 114 (e.g., from the sensors or sensor/actuators) and/or transmit control commands to the resource-constrained devices 110, 112, 114 (e.g., to the actuators or sensors/actuators). For example, the resource-constrained devices 110, 112, 114 may communicate with the trusted third party 204 over a network (not shown) including, for example, the Internet or some other data network, including, but not limited to, any suitable wide area network or local area network. In various aspects, the trusted third party 204 can be any suitable computing device capable of communicating with entities through a secure channel, such as a single-board computer (e.g., a Raspberry Pi), a personal computer, a server, etc. depending on the scale of deployment and complexity of data in the system 200. The trusted third party 204 may perform the functions of a router 108 as described in the system 100.

The trusted third party 204 may transmit the aggregated data from the resource-constrained devices 110, 112, 114 to, or receive commands from, the management system 102 over a network 206. The network 206 can include, for example, the Internet or some other data network, including, but not limited to, any suitable wide area network or local area network. In various aspects, the management system 102 may be a suitable platform (e.g., EmonCMS) for processing and storing the data it receives. In some examples, the management system 102 may be in communication with a mobile application and web portal for analyzing and visualizing the stored data. The management system 102 may employ a secure firewall in order to protect data against different attacks. The management system 102 may encrypt all stored data for further protection. The management system 102 can be considered a backup endpoint for the data.

The key generator 202 may be any suitable entity with a processor in communication with a memory such that the key generator 202 is capable of generating a public key, a master private key, and a decryption key. In one example, the key generator 202 may store and execute an algorithm that randomly generates a public key and a master private key. The generated public key is publicly known by all entities in the system 200 and is used for encryption purposes throughout the security architecture. The key generator 202 may store the generated master private key in its memory, which is kept secret to only the key generator 202.

The key generator 202 may also generate a decryption key for a member entity of the system 200. In at least one example, the key generator 202 may generate decryption keys using an algorithm that takes the master private key and the access policy as inputs and produces a decryption key. The access policy is associated with the unique attributes related to each entity of the system 200. A decryption key may be generated based on a member entity's unique attributes associated with the access policy of the ABE scheme. For instance, as described above, a common distinction can be made between sensors, actuators, and sensors/actuators. Sensors, such as the example resource-constrained device 110, only transmit data to the trusted third party 204 and do not receive any communication from the trusted third party 204, as shown by the one-sided arrow of the data stream 218. As such, sensors encrypt their sensor data and transmit the encrypted sensor data to the trusted third party 204, and therefore have no need for a decryption key. The key generator 202 may therefore transmit the public key to the resource-constrained device 110, but not a decryption key, via the data stream 210.

On the other hand, actuators, such as the example resource-constrained device 112, only receive data from the trusted third party 204, as shown by the one-sided arrow of the data stream 220. As such, actuators decrypt control commands they receive from the trusted third party 204. The key generator 202 may therefore transmit a decryption key to the resource-constrained device 112, but not the public key, via the data stream 212. A sensor/actuator, such as the example resource-constrained device 114, can both transmit data to and receive data from the trusted third party 204, as shown by the double-sided arrow of the data stream 222. As such, sensors/actuators both encrypt and transmit encrypted data and decrypt received commands. The key generator 202 may therefore transmit both the public key and a decryption key to the resource-constrained device 114 via the data stream 214.

The trusted third party 204 may decrypt the encrypted data received from the sensors and sensors/actuators (e.g., the resource-constrained devices 110 and 114) and may also encrypt commands to be transmitted to the actuators and sensors/actuators (e.g., the resource-constrained devices 112 and 114). The key generator 202 may therefore transmit the public key and a decryption key to the trusted third party 204 via the data stream 216.

In one example, the resource-constrained devices 110 and 114 (i.e. the sensors and sensors/actuators) and the trusted third party 204 may store and execute an encryption algorithm for encrypting a message that is associated with a set of attributes intrinsic to the encrypting entity. A cipher-text may be produced carrying the attributes to be validated across the access policy. In another example, the resource-constrained devices 112 and 114 (i.e. the actuators and sensors/actuators) and the trusted third party 204 may store and execute a decryption algorithm that uses a decryption key to decrypt the cipher-text carrying the attributes for the encrypting entity. If the attributes satisfy the access policy contained in the decryption key, then the message is successfully decrypted. Otherwise, a null message is returned.

In various aspects, the public key, master private key, and decryption keys may be generated and stored, or transmitted to their respective entities of the system 200, while the resource-constrained devices 110, 112, 114 are offline. Stated differently, the resource-constrained devices 110, 112, 114 are offline when they are not yet connected in the mesh network 106 nor connected with the management system 102. In such aspects, the resource-constrained devices 110, 112, 114 are equipped with the needed encryption and/or decryption keys when the mesh network 106 and communication with the management system 102 are established.

In one particular example, resource-constrained IoT devices (e.g., the resource-constrained devices 110-116) may be distributed in different physical locations inside a school (e.g., classrooms, laboratories, storerooms, etc.) as an initiative for targeting energy efficiency and eco-friendly electrical consumption. For instance, the resource-constrained IoT devices may measure data related to energy consumption of the attached appliances/switchboards, and related to the environment including the ambient temperature, humidity, light intensity, and whether someone is present. In this example, each physical location in a local zone of the school incubates two types of resource-constrained IoT devices: a smart power plug unit and an environmental sensing unit. A smart power plug unit produces sensing data related to the electrical power consumption of appliances/switchboards connected to the smart power plug unit. The environmental sensing unit produces sensing data related to temperature, humidity, presence status, and light intensity. The resource-constrained IoT devices form a wireless sensor network that communicate with each other in a mesh network topology (e.g., the mesh network 106) to delegate data to a root node (e.g., the resource-constrained device 110) that aggregates all data from the resource-constrained IoT devices. Each zone of the school may have its own mesh network of resource-constrained IoT devices. Each mesh network may be identified by credentials, including a network name and password, which distinguish each mesh network from another. When a resource-constrained IoT device joins a particular mesh network, the resource-constrained IoT device acquires these credentials.

The root node may thereafter connect via an access point or router (e.g., the trusted third party 204) with a cloud server or an energy management system (e.g., the management system 102) which monitors and analyzes the collected data for higher energy efficiency. The data transmitted and received among the resource-constrained IoT devices, trusted third party, and energy management system may be encrypted and decrypted via the security architecture described above in relation to the example system 200. For instance, regarding the upstream direction of data transmission (e.g., from a sensor unit to the energy management system) intrinsic attributes of each encrypting entity are associated with the encryption process. In this example, the set of attributes of an encrypting resource-constrained IoT device includes {Device ID, Zone ID, School ID}. Each resource-constrained IoT device has its own intrinsic Device ID that distinguishes it from any other resource-constrained IoT device in the same zone of Zone ID in a school of school ID. As there are a specific number of member IoT devices in a local zone, the trusted third party may check if the device is an authorized member. The Device ID, Zone ID, and School ID may be assigned when the resource-constrained IoT devices are offline.

Figure 3:
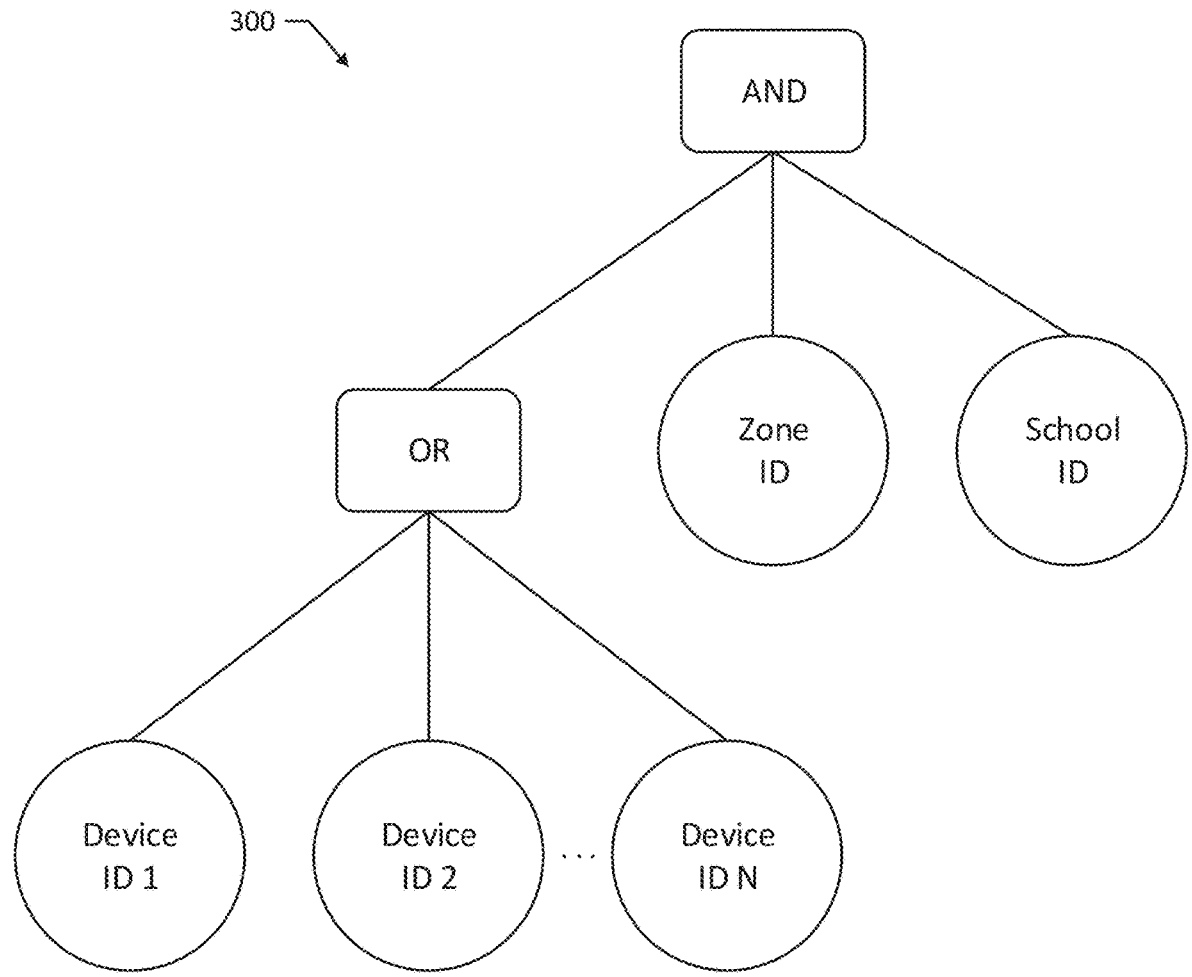
FIG. 3 illustrates a block diagram of an access policy at a trusted third party, according to an aspect of the present disclosure.

The set of leaves in the access policy at the trusted third party are associated with the decryption process. FIG. 3 illustrates a block diagram of an access policy 300 at the trusted third party. The access policy 300 may be embedded within the decryption key of the trusted third party for decrypting data received from the resource-constrained IoT devices. The set of leaves in the access policy 300 are a set of qualities possessed by the encrypting entity that should be satisfactory to the access structure upon decryption. If a particular Device ID is satisfied to be a member of the mesh network, with the required local Zone ID and School ID, then encrypted data received from the particular resource-constrained IoT device having that Device ID can be decrypted successfully.

Figure 4:
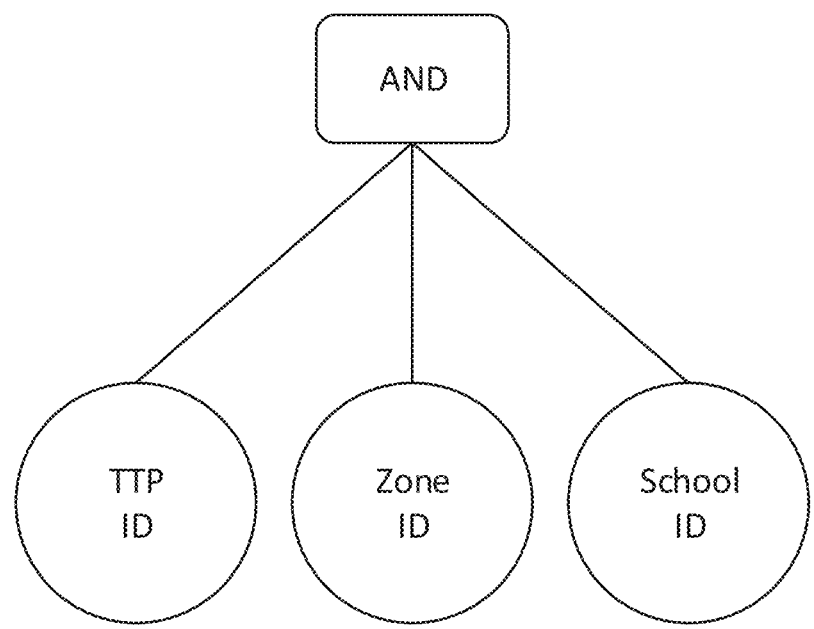
FIG. 4 illustrates a block diagram of an example access policy at a decrypting resource-constrained IoT device, according to an aspect of the present disclosure.

Regarding the downstream direction of data transmission (e.g., from the energy management system to a sensor unit), the set of attributes of the trusted third party may include {TTP ID, Zone ID, School ID}. The TTP ID, Zone ID, and School ID may be assigned when the resource-constrained IoT devices and the trusted third party are offline. The set of leaves in the access policy at a decrypting resource-constrained IoT device are associated with the decryption process. FIG. 4 illustrates a block diagram of an example access policy 400 at a decrypting resource-constrained IoT device. The access policy 400 may be embedded within the decryption key of a resource-constrained IoT device that is an actuator or sensor/actuator for decrypting control commands received from the trusted third party. Actuators and sensors/actuators can only decrypt control commands received from a particular trusted third party. The attributes possessed by the trusted third party should comply with the access policy 400 for successful decryption. If a TTP ID is satisfied to be a trusted third party with the required Zone ID and School ID, then the resource-constrained IoT device that is an actuator or sensor/actuator can decrypt an encrypted command received from the trusted third party. Notably, the access policy 400 is simpler than the access policy 300, which enables a resource-constrained IoT device to consume less time in the decryption process and is also convenient for the trusted third party since the trusted third party is not occupied with other tasks related to data collection or multi-hop networking.

The inventors experimentally validated the provided system having a mesh network with an integrated KPABE security scheme by implementing it on two different IoT platforms and comparing the results to a computer as a benchmark. The first IoT platform was the ESP32 chip known in IoT deployments, which is supported with a dual-core microcontroller at 240 MHz, 520 KB of SRAM, and 448 KB of programmable ROM, and with both WiFi and Bluetooth connectivity facilitating a wide range of IoT applications and ensuring ultra-low power consumption. The second IoT platform was the Raspberry Pi Zero W, which is supported with a single-core CPU at 1 GHz and 512 MB RAM. The benchmarking was done using an Apple® MacBook Pro® computer of 2.4 GHz quad-core 8th-generation Intel Core i5 processor, and 8 GB 1867 MHz LPDDR3 memory. The KPABE scheme implemented in the experimental validation was based on the YCT-KPABE library in Ikalchev on Github Official Website, available at https://github.com/ikalchev/kpabe-yct14-cpp [Accessed Nov. 26, 2019] ("Ikalchev"), which implements the KPABE scheme in X. Yao, Z. Chen, and Y. Tian, "A lightweight attribute-based encryption scheme for the Internet of Things," Future Generation Computer Systems, vol. 49, pp. 104-112, August 2015. The implemented KPABE scheme was based on elliptic curves at a security strength of 80 bits, which is equivalent to a 1024-bit RSA encryption.

The YCT-KPABE library was implemented on the ESP32 platform using its own mbedLTS component embedded within ESP32's IoT Development Framework (IDF). The inventors modified the library in Ikalchev by compiling the arithmetic libraries GNU Multiple Precision Arithmetic Library (GMP) (GMP Arithmetic Without Limitations, https://gmplib.org/[Accessed Nov. 26, 2019]) and Pairing-Based Cryptography (PBC) (PBC Library, https://crypto.stanford.edu/pbc/[Accessed Nov. 26, 2019]) to be compatible with ESP32's Xtensa GCC compiler making the aforementioned two libraries applicable on the constrained device ESP32.

Figure 5A:
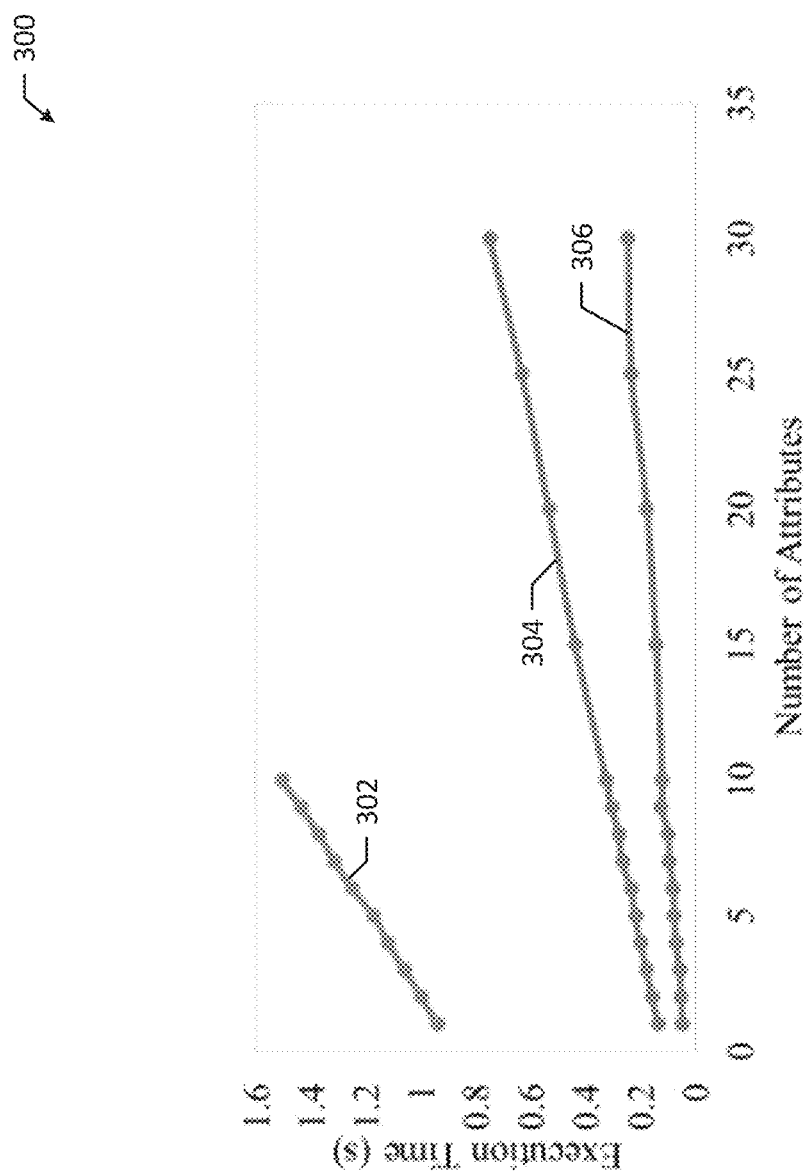
FIG. 5A illustrates a graph showing the execution time for the Setup algorithm against increasing number of attributes on the ESP32 IoT platform, the Raspberry Pi Zero W platform, and the computer.
Figure 5B:
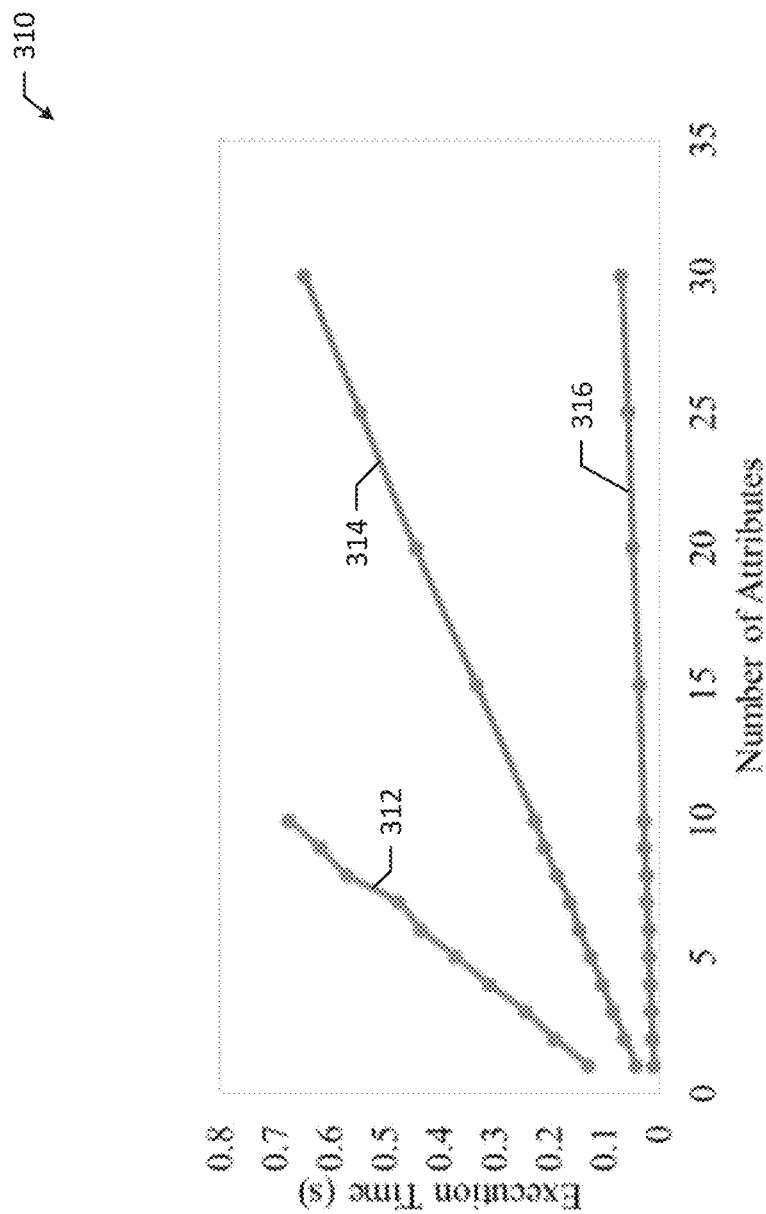
FIG. 5B illustrates a graph showing the execution time for the Encryption algorithm against increasing number of attributes on the ESP32 IoT platform, the Raspberry Pi Zero W platform, and the computer.
Figure 5C:
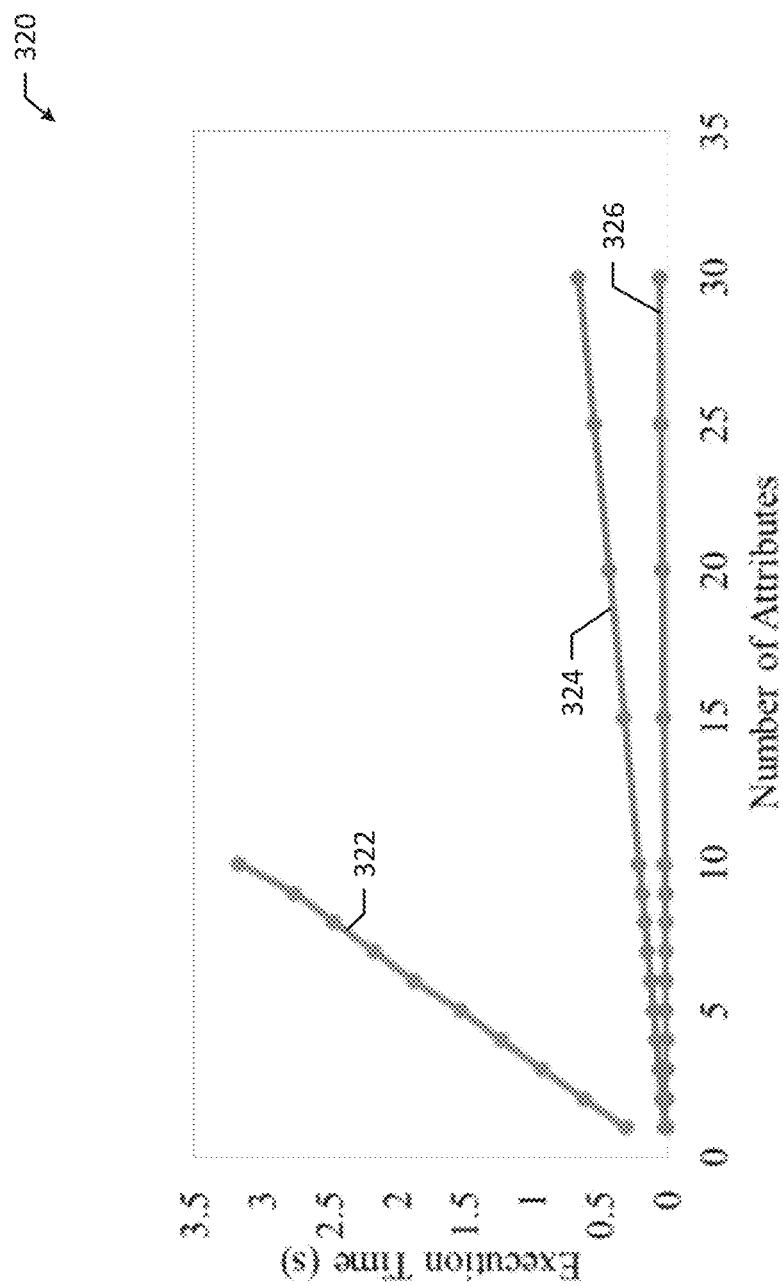
FIG. 5C illustrates a graph showing the execution time for the Decryption algorithm against increasing number of attributes on the ESP32 IoT platform, the Raspberry Pi Zero W platform, and the computer.

The execution time for each of the Setup (FIG. 5A), Encryption (FIG. 5B), and Decryption (FIG. 5C) algorithms was measured as the number of attributes increases up to 30 attributes. The execution time at each attribute was recorded 5 times, and the average values are computed and represented. FIG. 5A illustrates a graph 500 showing the execution time for the Setup algorithm against increasing number of attributes on the ESP32 IoT platform (line 502), the Raspberry Pi Zero W platform (line 504), and the computer (line 506). FIG. 5B illustrates a graph 510 showing the execution time for the Encryption algorithm against increasing number of attributes on the ESP32 IoT platform (line 512), the Raspberry Pi Zero W platform (line 514), and the computer (line 516). FIG. 5C illustrates a graph 520 showing the execution time for the Decryption algorithm against increasing number of attributes on the ESP32 IoT platform (line 522), the Raspberry Pi Zero W platform (line 524), and the computer (line 526).

It can be noticed from FIGS. 5A to 5C that in all Setup, Encryption, and Decryption algorithms, execution time increases with increasing number of attributes. The performance is benchmarked with the scheme's implementation on the computer. Raspberry Pi Zero W showed significantly faster results in all three algorithms than ESP32. The former can be considered as a valuable solution for safe data communication in IoT deployments, and a preferable solution based on the proposed analysis for KPABE schemes in constrained-resources platforms.

After testing KPABE on a sample resource-constrained device, the inventors implemented the communication infrastructure using an interconnected mesh network between the IoT resource-constrained devices. This permitted a scalable deployment of smart devices that can be included within the coverage area of the router without the necessity to directly connect to the router. Instead, the devices could collaboratively route, or hop, their data to each other to eventually deliver it to the cloud. The outcomes of the mesh network framework implementation were integrated with the KPABE security scheme. The KPABE scheme was deployed on top of the mesh framework to securely transmit and receive encrypted data without the need for secure communication channels for resource-constrained platforms such as the ESP32.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A system for secure internet-of-things communications, the system comprising:
   a management system;
   a trusted third party system in communication with the management system;
   a mesh network of a plurality of resource-constrained devices, wherein the plurality of resource-constrained devices include a root node in communication with the trusted third party system via a network, wherein each of the plurality of resource-constrained devices is directly or indirectly in communication with the root node, and wherein the root node is one of the plurality of resource-constrained devices; and
   a key generator in communication with the trusted third party system and each of the plurality of resource-constrained devices, the key generator configured to generate a public key, a private key, and a decryption key, wherein the private key is stored within a memory of the key generator, wherein the public key is shared with the trusted third party system and each resource-constrained device capable of encrypting data, and wherein the decryption key is shared with the trusted third party system and one of the plurality of resource-constrained devices which is capable of decrypting data,
   wherein data is encrypted and decrypted between the trusted third party system and the plurality of resource-constrained devices in the mesh network via an attribute-based encryption scheme integrated with the mesh network.

2. The system of claim 1, wherein the attribute-based encryption scheme is a key policy attribute-based encryption scheme.

3. The system of claim 1, wherein the root node is automatically selected from the plurality of resource-constrained devices.

4. The system of claim 3, wherein the root node is automatically selected based on a signal strength of each of the plurality of resource-constrained devices with respect to an access point.

5. The system of claim 4, wherein the resource-constrained device with the greatest signal strength is selected as the root node.

6. The system of claim 1, wherein the root node is manually selected by a user of the system.

7. The system of claim 1, wherein a resource-constrained device indirectly in communication with the root node communicates with the root node via another resource-constrained device of the plurality of resource-constrained devices.

8. The system of claim 1, wherein the root node is in communication with the management system via the network through an access point.

9. The system of claim 8, wherein the access point is a router.

10. The system of claim 8, wherein the access point is the trusted third party.

11. The system of claim 1, wherein each of the plurality of resource-constrained devices includes a sensor or an actuator.

12. The system of claim 1, wherein at least one of the plurality of resource-constrained devices is a mobile device.

13. The system of claim 1, wherein each of the plurality of resource-constrained devices includes an internal power source.

14. The system of claim 1, wherein at least one of the plurality of resource-constrained devices includes a serializer having a multi-stage binarizer configured to break down each component of an object of the attribute-based encryption scheme into its low-level counterparts, the components of the object of the attribute-based encryption scheme including a ciphered message, the decryption key, encryption parameters, and the private key.

15. The system of claim 1, wherein at least one of the plurality of resource-constrained devices includes a deserializer comprising a disaggregator configured to disaggregate a character vector of a received serialized object into character vectors corresponding to each component of an object of the attribute-based encryption scheme, the components of the object of attribute-based encryption scheme including a ciphered message, the decryption key, encryption parameters, and the private key.

16. The system of claim 15, wherein the deserializer further comprises a multi-stage debinarizer configured to deserialize the character vectors corresponding to each component of the object of the attribute-based encryption scheme into original complex objects.

17. A system for secure internet-of-things communications, the system comprising:
   a management system;
   a trusted third party system in communication with the management system;
   a mesh network including a plurality of resource-constrained devices, each of the plurality of resource-constrained devices being a sensor, an actuator, or a sensor/actuator, wherein the plurality of resource-constrained devices include a root node in communication with the trusted third party via a network, wherein each of the plurality of resource-constrained devices is directly or indirectly in communication with the root node, and wherein the root node is one of the plurality of resource-constrained devices; and
   a key generator in communication with the trusted third party system and each of the plurality of resource-constrained devices, the key generator configured to generate a public key, a private key, and a decryption key, wherein the private key is stored within a memory of the key generator, wherein the public key is shared with the trusted third party system and each sensor and sensor/actuator of the resource-constrained devices, and wherein the decryption key is shared with the trusted third party system and each actuator and sensor/actuator of the resource-constrained devices,
wherein data is encrypted and decrypted between the trusted third party system and the plurality of resource-constrained devices in the mesh network via a key policy attribute-based encryption scheme integrated with the mesh network.

18. The system of claim 17, wherein the key policy attribute-based encryption scheme is programmed in a respective memory of each of the plurality of resource constrained devices.

19. The system of claim 17, wherein each of the plurality of resource-constrained devices is in wireless communication with one another.

20. The system of claim 17, wherein the management system is configured to receive data from one or more of the plurality of resource-constrained devices via the trusted third party and to transmit a command to one or more of the plurality of resource-constrained devices via the trusted third party based on the received data.

* * * * *